United States Patent [19]

Tomisawa

[11] Patent Number: 4,839,551
[45] Date of Patent: Jun. 13, 1989

[54] BRUSHLESS MOTOR STRUCTURE ENABLING ACCURATE RELATIVE POSITIONING OF ROTOR AND STATOR COILS

[75] Inventor: Takehiko Tomisawa, Kakuda, Japan

[73] Assignee: Alps Electric Co., Ltd., Japan

[21] Appl. No.: 173,671

[22] Filed: Mar. 25, 1988

[30] Foreign Application Priority Data

Jul. 17, 1987 [JP] Japan .............................. 62-109599

[51] Int. Cl.⁴ .............................................. H02K 5/16
[52] U.S. Cl. ......................................... 310/90; 310/43; 310/156; 310/184; 310/268; 384/129; 384/420
[58] Field of Search ............ 310/90, 43, 268, DIG. 6, 310/68 R, 184, 156, 254, 89, 91, 42, 180, 208; 384/129, 420

[56] References Cited

U.S. PATENT DOCUMENTS

| | | | |
|---|---|---|---|
| 2,615,069 | 10/1952 | Gallagher | 310/90 UX |
| 3,845,339 | 10/1974 | Merkle | 310/268 |
| 3,912,956 | 10/1975 | Muller | 310/258 |
| 4,007,390 | 2/1977 | Muller | 310/90 |
| 4,174,484 | 11/1979 | Schmider | 310/68 R |
| 4,517,480 | 5/1985 | Muller | 310/68 R |
| 4,649,306 | 3/1987 | Yamashita | 310/90 |
| 4,757,222 | 7/1988 | Shiraki | 310/254 |

Primary Examiner—R. Skudy
Attorney, Agent, or Firm—Guy W. Shoup; Paul J. Winters; Brian D. Ogonowsky

[57] ABSTRACT

A brushless motor is disclosed having a plurality of stator coils disposed circumferentially around a rotatable shaft and a rotor magnet supported to a yoke fixed to the rotatable shaft and opposed to the stator coils. A radial bearing, for radially supporting the shaft, is supported at the center of a coil supporting member supporting the plurality of stator coils. The coil supporting member is formed integral with the radial bearing and is fixed to a casing having a thrust bearing at its center for axially supporting the shaft. Thus, the relative positional accuracy between the stator coil, thrust bearing, and radial bearing can be made high resulting in a stable rotating speed.

2 Claims, 1 Drawing Sheet

BRUSHLESS MOTOR STRUCTURE ENABLING ACCURATE RELATIVE POSITIONING OF ROTOR AND STATOR COILS

BACKGROUND OF THE INVENTION

1. Field of the Invention

This invention relates to a brushless motor used to drive a cylinder head in a rotary head type tape player, to drive an optical disk in an optical disk player or to drive a tape reel in a tape player and, more particularly, to a brushless motor which is stably rotated without irregularity in a gap between a stator coil and a rotor magnet.

2. Description of the Prior Art

FIG. 3 shows a half sectional view of a conventional brushless motor.

In a conventional brushless motor, a radial bearing 2 and a thrust bearing 3 for supporting a rotational shaft 1 are held in a case 4. A plurality of stator coils 6 are supported on a printed substrate 5 fixed to the case 4. A bracket 7 is fixed to the rotational shaft 1, a yoke 8 is fixed to the bracket 7, and a rotor magnet 9 is supported to the yoke 8. An opposite yoke 10 is fixed to the bracket 7, and the stator coil 6 is interposed between the yoke 10 and the rotor magnet 8.

In the brushless motor of this type, a current flows radially at the rotational shaft 1 as a center in the portion of the stator coil 6. The rotor magnet 9 is alternatively magnetized at N- and S-poles circumferentially. The rotational shaft 1 is rotatably driven by means of the electromagnetic force produced by the current flowing to the stator coil 6 and the pole of the rotor magnet 9. The rotary power is transmitted externally, for example, through a pulley 7a formed integrally with the bracket 7.

In the brushless motor of this type, it is preferable that a gap $\delta$ between the stator coil 6 and the rotor magnet 9 is constant in the entire opposed area of both. However, in the conventional structure shown in FIG. 3, the causes for determining the relatively mounting accuracy of the stator coil 6 and the rotor magnet 9 are induced by various factors, such as the overturn of the rotor magnet 9 with respect to the rotational shaft 1, the perpendicularity of the case 4 with respect to the radial bearing 2, the overturn of the printed substrate 5 with respect to the case 4. Thus, it is difficult to maintain the relative positional accuracy between the stator coil 6 and the rotor magnet 9 high, and the gap $\delta$ of both becomes irregular in the rotating range. When the gap $\delta$ becomes irregular in this manner, wow and flutter occur by the rotation of the rotor magnet 9, and the driving torque also becomes irregular, thus the rotation becoming unstable.

SUMMARY OF THE INVENTION

Accordingly, an object of this invention is to provide a brushless motor which eliminates the above-mentioned drawbacks and can maintain the relatively positional accuracy between a stator coil and a rotor magnet high and perform a stable rotating operation.

In order to achieve the above and other objects of the invention, there is provided according to the present invention a brushless motor having a plurality of stator coils disposed circumferentially at a rotational shaft as a center, and a rotor magnet supported to a yoke fixed to the rotational shaft and opposed to the stator coils comprising a radial bearing held at the center of a coil supporting member for supporting the plurality of stator coils, whereby the rotational shaft is inserted into the radial bearing.

According to the present invention, the coil supporting member is connected to the radial bearing for supporting the rotational shaft. Thus, the overturning accuracy of the stator coils with respect to the rotational shaft can be readily enhanced. More specifically, since the stator coils and the rotor magnet can be both positioned with respect to the rotational shaft, the relative positional accuracy of the rotor magnet and the stator coils can be increased without accuracy of other many components as the conventional brushless motor. Further, when the coil supporting member is molded with resin and the stator coils are insert molded with the coil, the positional accuracy of the stator coils with respect to the bearing can be not only enhanced, but also the manufacture thereof can be simplified.

The above and other related objects and features of the invention will be apparent from a reading of the following description of the disclosure found in the accompanying drawings and the novelty thereof pointed out in the appended claims.

DESCRIPTION OF THE PREFERRED EMBODIMENT

An embodiment of a brushless motor according to the present invention will be described in detail with reference to FIGS. 1 and 2.

Figure 1:
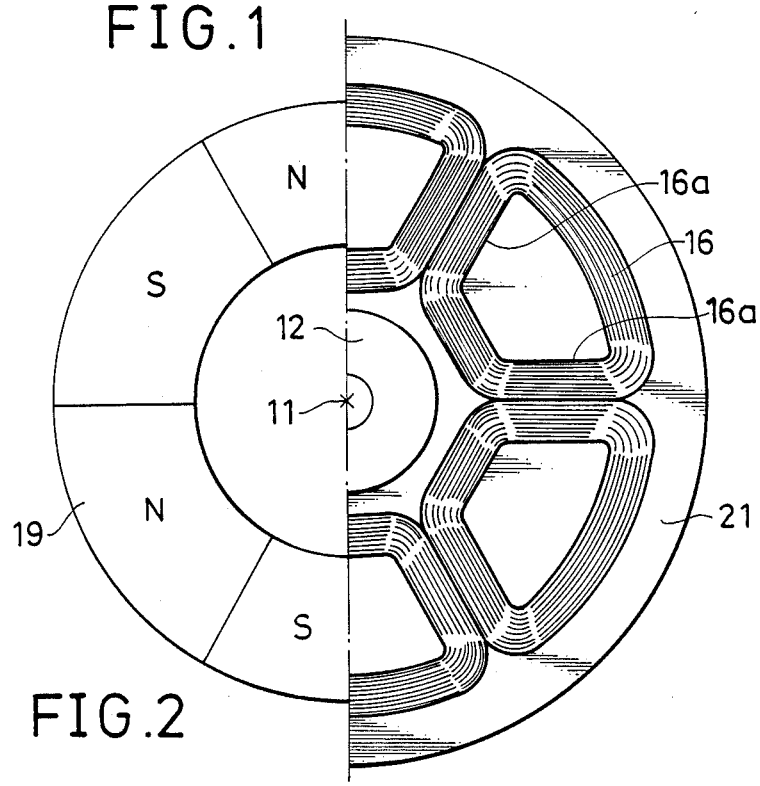
FIG. 1 is a plan view showing stator coils and a rotor magnet in an embodiment of a brushless motor according to the present invention.
Figure 2:
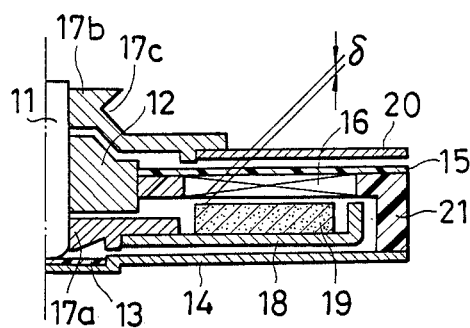
FIG. 2 is a half sectional view of the embodiment of the brushless motor.
Figure 3:
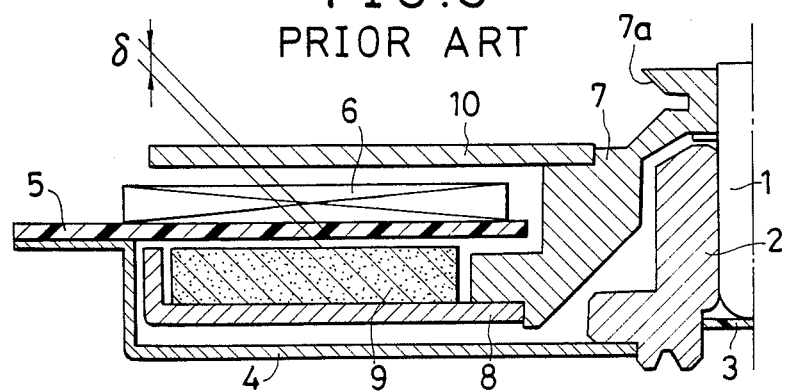
FIG. 3 is a half sectional view showing a conventional brushless motor.

FIG. 1 is a plan view showing stator coils and a rotor magnet in an embodiment of a brushless motor according to the present invention, and FIG. 2 is half sectional view of the embodiment of the brushless motor.

The brushless motor of this embodiment comprises a plurality of stator coils 16. The stator coils 16 are arranged at an equal pitch circumferentially at a rotational shaft 11 as a center. A current flows radially in the linear portion 16a of the stator coil 16 at the rotational shaft 11 as a center. The plurality of stator coils 16 are fixed on a printed substrate 15, and held by a coil supporting member 21. The coil supporting member 21 is formed of resin, and the stator coils 16 are integrated by insert molding the stator coils 16 with the coil supporting member 21. Currents are supplied through a conductor pattern formed on the printed substrate 15 to the stator coils 16. As shown in FIG. 2, the radial bearing 12 is held at the center of the coil supporting member 21. A case 14 is fixed to the lower surface of the coil supporting member 21, and a thrust bearing 13 is fixed to the center of the case 14. The rotational shaft 11 is supported radially by the radial bearing 12, and by the thrust bearing 13 in its thrust direction.

Two brackets 17a and 17b are fixed to the supporting shaft 11. A yoke 18 is fixed to the lower bracket 17a, and a rotor magnet 19 is fixed to the yoke 18. As shown in FIG. 1, N-poles and S-poles are magnetized alternatively circumferentially at the rotational shaft 11 as a center on the surface of the rotor magnet 19 opposed to the stator coils 16. An opposite yoke 20 is fixed to the upper bracket 17b. A pulley 17c is integrally formed with the upper end of the bracket 17b.

In the embodiment of this brushless motor, the radial bearing 12 is held by the coil supporting member 21, and the rotational shaft 11 is inserted into the radial bearing 12. Thus, the perpendicularity of the stator coils 16 with respect to the rotational shaft 11 can be held in high accuracy by controlling the perpendicularity to the radial bearing 12 and the coil supporting member 21. Since the rotor magnet 19 is fixed to the rotational shaft 11 through the yoke 18, the rotor magnet 19 can be accurately mounted on the rotational shaft 11 by controlling the perpendicularity of the rotational shaft 11 with respect to the yoke 18. As a result, the irregularity of the gap $\delta$ between the stator coils 16 and the rotor magnet 19 can be suppressed to the minimum limit.

In the embodiment of this brushless motor, a current is supplied through the conductor pattern of the printed substrate 15 to the stator coils 16. The rotational shaft 11 is rotatably driven by the electromagnetic force generated by the current flowing radially in the linear portion 16a of the stator coil 16 and the pole of the rotor magnet 19. The rotary power is transmitted through the pulley 17c formed at the upper bracket 17b. As described above, the irregularity of the gap $\delta$ between the stator coils 16 and the rotor magnet 19 can be minimized only by controlling the perpendicularity of the bearing 12 and the coil supporting member 21 and the perpendicularity of the yoke 18 with respect to the rotational shaft 11. Thus, when the rotor magnet 19 is rotated, the change in the gap $\delta$ in the rotating range can be extremely reduced to prevent wow and flutter and an irregularity in the torque from occurring.

According to the present invention as described above, the components regarding the overturning accuracy of the stator coils and the rotor magnet can be reduced. Thus, the relative overturn of the coils and the magnet can be reduced merely by controlling the tolerance of the components of the minimum limit. Therefore, the variation in the gap between the stator coils and the rotor magnet can be suppressed during the rotation of the brushless motor to prevent the wow and flutter and the irregularity in the torque of the motor from occurring.

In one embodiment the coil supporting member is formed of resin, the stator coils are insert molded with the resin, and the radial bearing is held in the center of the resin coil supporting member to easily set the perpendicularity of the rotational shaft and the stator coils as well as to simply mount the stator coils.

What is claimed is:

1. A brushless motor comprising:
   a plurality of planar stator coils arranged circumferentially around a rotatable shaft;
   a radial bearing for radially supporting said rotatable shaft;
   a thrust bearing fixed to a center of a casing, said thrust bearing for axially supporting said rotatable shaft;
   a stator coil supporting member formed of a resin material, said plurality of stator coils being integrally formed within said resin material, said radial bearing being integrally formed with, and totally supported by,
   said stator coil supporting member, said casing being fixed to said stator coil supporting member;
   a rotor magnet supported on a first yoke fixed to said rotatable shaft and opposed to a first side of said planar stator coils; and
   a second yoke fixed to said rotatable shaft and opposed to a side of said planar stator coils opposite said first side.

2. The motor of claim 1 wherein said rotor magnet is opposed to a side of said planar stator coils which is facing said casing.

* * * * *